Patented May 26, 1936

2,041,747

UNITED STATES PATENT OFFICE 2,041,747

MANUFACTURE OF ALIPHATIC ANHYDRIDES

Henry Dreyfus, London, England

No Drawing. Application August 25, 1933, Serial No. 686,735. In Great Britain September 9, 1932

11 Claims. (Cl. 260—123)

This invention relates to the manufacture of aliphatic anhydrides by thermal decomposition of the corresponding acids, and especially to the manufacture of acetic anhydride by thermal decomposition of acetic acid.

The scission of acetic acid into acetic anhydride and water vapor under the influence of catalysts is commonly effected in reaction vessels constructed of or lined with a base metal, i. e. a metal such as copper, nickel, or other metal capable of being oxidized. Under such conditions, however, it has been found that the yield of anhydride is diminished by the occurrence of a more fundamental decomposition of the acetic acid and/or anhydride.

I have now found that such decomposition may be considerably reduced or even entirely avoided and that in consequence superior yields of anhydride may be obtained, if when employing such reaction vessels the acetic or other aliphatic acid is brought into contact with the catalysts in presence of solid reducing agents, within which I include reduction products of catalysts for the reaction.

By the term "reduction products of catalysts for the reaction" I mean substances standing in a reduction relationship to such catalysts, whether the reduction can actually be carried out in practice or not.

As examples of catalysts that may be employed for the purposes of the invention may be mentioned phosphoric acids, orthophosphates, pyrophosphates and metaphosphates, especially of the alkali and alkali earth metals, borates, silicates, tungstates, especially alkali earth metal tungstates, etc. The catalysts may be employed in any convenient way; for example they may be deposited upon or otherwise in association with carriers or filling materials, such as pumic, silica gel, and the like, or they may be employed as sole or part constituents of molten baths, or in suspension or solution in molten baths comprising other substances which may or may not have a catalytic effect on the reaction; or any other method of employing the catalysts may be adopted.

Any suitable reducing agent, whether solid or fluid, may be employed. Thus for example when the catalyst is employed in the form of a molten bath, elementary carbon, for instance in the form of lamp black, may be added to or incorporated in the bath, while when a solid catalyst is to be used, it may be deposited on or spread on an inert carrier or filling material in association with lamp black or other form of divided elementary carbon. In this way more satisfactory results may be obtained than when the only reducing agent is the carrier for the catalyst, for example when graphite or other form of carbon is employed as carrier.

In addition to the solid reducing agents fluid and especially gaseous reducing agents also may be employed, for example hydrogen, carbon monoxide, or gas mixtures such as water gas which comprise one or both of these gases. Thus the acetic acid vapor may, prior to admission to the reaction zone, be mixed with the reducing gas or mixture of gases to be employed, or the acid vapor and the reducing gas, both being preferably preheated, may be introduced separately and simultaneously or alternately to the reaction zone. Conveniently the acetic acid may be vaporized by passing a hot reducing gas through the liquid acid, which may also if desired itself be heated. Further, the reducing gas, heated to a temperature above that required for the decomposition, may be employed to supply at least part of the heat required to raise the acid vapors to the decomposition temperature, as described in U. S. Patent No. 1,915,569.

In a most valuable and preferred method of applying the invention a solid reducing agent comprising a reduction product of a catalyst for the reaction may be employed. Thus for example phosphate catalysts may be used in conjunction with the corresponding phosphites or hypophosphites, etc. so long as these compounds are sufficiently stable at the temperatures employed for the decomposition. Thus a calcium phosphate catalyst may be used in association with calcium phosphite, zinc phosphate with zinc phosphite, etc. Moreover, compounds of this type may be employed in conjunction with catalysts not bearing a direct oxidation—reduction relationship thereto. Thus calcium phosphite may be employed in association with for example potassium metaphosphate or even with calcium or barium tungstate or with other catalysts.

The thermal decomposition may be effected at any convenient temperature. Thus temperatures between 300° and 900° C. and especially between 600° and 800° C., may be employed with advantage. In cases where substances are used, such as phosphites, that are liable to decompose at high temperatures, temperatures below their decomposition points should of course be employed; usually temperatures between 600° and 700° or 750° C. may be employed in such cases. Advantageously the acid may be preheated to temperatures approaching the decomposition temperature.

The acetic anhydride may be separated from the water formed in the reaction or originally present in any convenient way. Preferably such separation is effected before condensation of substantial quantities of water. For instance, the anhydride—water vapor mixture may be subjected to fractional condensation, for example in one or more fractionating columns whose ends are maintained at temperatures such that the anhydride is condensed, while the water remains in vapor form, as described and claimed in U. S. Patent No. 1,735,957 or 1,735,959; or the mixture may be treated with a high boiling solvent for the anhydride, being a non-solvent for water, such as a phenol ether, as described and claimed in U. S. Patent No. 1,915,573 or U. S. applications S. Nos. 514,900 and 514,903, both filed 10th February, 1931. Again, as described and claimed in U. S. application S. No. 284,566, filed 11th June, 1928, the water may be removed by means of entraining liquids therefor, such as benzene, carbon tetrachloride, etc.

Another method that may be employed is the condensation of the vapors in an extracting liquid such as benzene or a mixture of chloroform with petrol, etc. cooled to a temperature below the boiling point of water under the conditions obtaining as described and claimed in U. S. application S. No. 285,613, filed 15th June, 1928; or the water may be separated by means of water-binding substances such as bisulphates, pyrosulphates, calcium, chloride, etc, as described and claimed in U. S. Patent No. 1,817,614, or any other convenient method may be employed.

The following examples are intended to illustrate the invention, which is in no way limited thereby.

*Example 1*

Acetic acid is vaporized, preheated to a temperature of 500° C. and led through a copper tube heated to 700° C., containing a contact mass comprising pumice on which calcium phosphate and calcium phosphite have been deposited. The reaction products are treated in any of the ways described above to separate the acetic anhydride from the water vapor before condensation of the latter.

*Example 2*

In the process described in Example 1, hydrogen is passed into the acid being vaporized so that the acid vapor is mixed with about half its volume of hydrogen. Carbon monoxide may be substituted for the hydrogen, or a mixture of these gases may be used.

*Example 3*

Acetic acid vapor is preheated to a temperature of 500° C. and is led in the form of fine bubbles into a copper-lined converter containing a molten composition comprising sodium metaphosphate and lithium metaphosphate in the approximate proportion 70:30, and containing about 15% of lamp black, the bath being maintained at a temperature of 725° C. After leaving the bath and the converter, the products are treated to isolate the acetic anhydride from the water vapor.

Although the invention has been described particularly with reference to the manufacture of acetic anhydride, it may be applied to the manufacture of aliphatic anhydrides in general. Thus for instance anhydrides of homologues or substitution products of acetic acid, such as propionic anydride and methoxy acetic anhydride, or mixed anhydrides such as a mixed acetic butyric anhydride may be produced according to the invention.

What I claim and desire to secure by Letters Patent is:—

1. Process for the manufacture of a lower aliphatic anhydride, which comprises thermally decomposing the corresponding acid to form the anhydride in a converter comprising an oxidizable metal in presence of a catalyst for the reaction and a solid metal-phosphorous-oxygen containing salt in which the phosphorous has a lower valence than in a phosphate.

2. Process for the manufacture of acetic anhydride, which comprises thermally decomposing acetic acid to form the anhydride in a converter comprising an oxidizable metal in presence of a catalyst for the reaction and a solid metal-phosphorous-oxygen containing salt in which the phosphorous has a lower valence than in a phosphate.

3. Process for the manufacture of propionic anhydride, which comprises thermally decomposing propionic acid to form the anhydride in a converter comprising an oxidizable metal in presence of a catalyst for the reaction and a solid metal-phosphorous-oxygen containing salt in which the phosphorous has a lower valence than in a phosphate.

4. Process for the manufacture of a lower aliphatic anhydride, which comprises thermally decomposing the corresponding acid to form the anhydride in a converter comprising an oxidizable metal in presence of a catalyst for the reaction and a phosphite.

5. Process for the manufacture of acetic anhydride, which comprises thermally decomposing acetic acid to form the anhydride in a converter comprising an oxidizable metal in presence of a catalyst for the reaction and a phosphite.

6. Process for the manufacture of acetic anhydride, which comprises subjecting acetic acid to thermal decomposition in a converter comprising an oxidizable metal in presence of calcium phosphate and a phosphite.

7. Process for the manufacture of a lower aliphatic anhydride, which comprises subjecting the corresponding acid to thermal decomposition in a converter comprising an oxidizable metal in presence of calcium phosphate and calcium phosphite.

8. Process for the manufacture of acetic anhydride, which comprises subjecting acetic acid to thermal decompositon in a converter comprising an oxidizable metal in pressnce of calcium phosphate and calcium phosphite.

9. Process for the manufacture of acetic anhydride, which comprises thermally decomposing acetic acid to form the anhydride in a converter comprising an oxidizable metal at a temperature between 600° and 900° C. in presence of a catalyst for the reaction and a solid metal-phosphorous-oxygen containing salt in which the phosphorous has a lower valence than in a phosphate.

10. Process for the manufacture of acetic anhydride, which comprises thermally decomposing acetic acid to form the anhydride in a converter comprising an oxidizable metal at a temperature between 600° and 900° C. in presence of a catalyst for the reaction and a phosphite.

11. Process for the manufacture of acetic anhydride, which comprises subjecting acetic acid to thermal decomposition in a converter comprising an oxidizable metal at a temperature between 600° and 750° C. in presence of a phosphate and a phosphite.

HENRY DREYFUS.